(12) United States Patent
Inoue et al.

(10) Patent No.: US 8,783,674 B2
(45) Date of Patent: Jul. 22, 2014

(54) STAGE

(75) Inventors: Yuya Inoue, Chigasaki (JP); Tamotsu Tanifuji, Chigasaki (JP); Hisato Tanaka, Chigasaki (JP); Makoto Takahashi, Hidaka (JP); Kuniyoshi Sekine, Hidaka (JP)

(73) Assignee: Ulvac, Inc., Chigasaki-shi (JP)

( * ) Notice: Subject to any disclaimer, the term of this patent is extended or adjusted under 35 U.S.C. 154(b) by 953 days.

(21) Appl. No.: 12/902,496

(22) Filed: Oct. 12, 2010

(65) Prior Publication Data

US 2011/0042876 A1 Feb. 24, 2011

Related U.S. Application Data

(63) Continuation of application No. PCT/JP2009/058910, filed on May 13, 2009.

(30) Foreign Application Priority Data

May 19, 2008 (JP) ................................. 2008-131004

(51) Int. Cl.
*B25B 1/00* (2006.01)
(52) U.S. Cl.
USPC .................................. 269/58; 269/60; 269/71
(58) Field of Classification Search
USPC .............. 269/60, 55, 71, 289 R, 900, 21, 903
See application file for complete search history.

(56) References Cited

U.S. PATENT DOCUMENTS

| | | | | |
|---|---|---|---|---|
| 4,409,860 A | * | 10/1983 | Moriyama et al. | 74/490.09 |
| 4,768,698 A | * | 9/1988 | Brown et al. | 228/18 |
| 4,896,869 A | * | 1/1990 | Takekoshi | 269/60 |
| 5,730,433 A | * | 3/1998 | Veres | 269/41 |
| 5,810,341 A | * | 9/1998 | Williams | 269/37 |
| 5,947,460 A | * | 9/1999 | Williams | 269/37 |
| 6,158,728 A | * | 12/2000 | Smith | 269/99 |
| 6,254,075 B1 | * | 7/2001 | Kozima | 269/73 |
| 6,332,604 B1 | * | 12/2001 | Chu | 269/71 |
| 6,637,737 B1 | * | 10/2003 | Beecherl et al. | 269/71 |
| 7,066,100 B2 | * | 6/2006 | Katayama | 108/161 |

(Continued)

FOREIGN PATENT DOCUMENTS

| | | |
|---|---|---|
| JP | 7-124831 | 5/1995 |
| JP | 7-311375 | 11/1995 |
| JP | 9-192567 | 7/1997 |
| JP | 2004-209411 A1 | 7/2004 |

(Continued)

OTHER PUBLICATIONS

International Search Report for International Application No. PCT/JP2009/058910 dated May 28, 2009.

*Primary Examiner* — Lee D Wilson
(74) *Attorney, Agent, or Firm* — Kratz, Quintos & Hanson, LLP

(57) ABSTRACT

Provided is a substrate stage which can transfer a substrate at a high speed. In the substrate stage of the present invention, auxiliary mounting tables are attached to a main mounting table, and lower rails are arranged over on the main mounting table and above the auxiliary mounting tables. When both ends of the lower rails are bent upwardly by a vertically adjusting unit in order to prevent the both ends of the lower rails to be bent downwardly, the lower rails are made straight. Since the lower rail is not divided, the linearity is ensured and the moving plate does not stutter so that transfer of the substrate at high speed can be performed.

7 Claims, 6 Drawing Sheets

(56) References Cited

U.S. PATENT DOCUMENTS

| | | | |
|---|---|---|---|
| 7,900,896 B2* | 3/2011 | Fujita | 269/58 |
| 7,959,141 B2* | 6/2011 | Makino | 269/58 |
| 7,971,864 B2* | 7/2011 | Kato | 269/43 |
| 8,511,659 B2* | 8/2013 | Hirakawa et al. | 269/35 |
| 2011/0042876 A1* | 2/2011 | Inoue et al. | 269/58 |
| 2012/0168999 A1* | 7/2012 | Zheng et al. | 269/60 |

FOREIGN PATENT DOCUMENTS

| | | |
|---|---|---|
| JP | 2005-114882 A1 | 4/2005 |
| JP | 2007-152215 A1 | 6/2007 |
| JP | 2008-5669 A1 | 1/2008 |
| JP | 2008-23699 A1 | 2/2008 |
| JP | 2008-93651 A1 | 4/2008 |
| WO | WO 2007/105455 A1 | 9/2007 |

* cited by examiner

STAGE

This application is a continuation of International Application No. PCT/JP2009/58910 filed May 13, 2009, which claims priority to Japanese Patent Document No. 2008-131004, filed on May 19, 2008. The entire disclosure of the prior applications are herein incorporated by reference in their entireties.

BACKGROUND

The present invention relates to a substrate stage to be used for an XY stage or a large-scale printing apparatus; and more particularly, the invention relates to a large-scale stage in which rails are connected.

Since granite is easily worked on to ensure plane precision and has small thermal strain and large raw stones are obtained, it is used for substrate stages in the XY stage, a large-scale printing apparatus, a three-dimensional inspection apparatus or the like.

Recently, substrates are getting larger, so that if the substrate stage is made larger to meet the large-scale substrate, the stage becomes so large that it cannot be transported on roads.

Therefore, there is a trial period in which small-area tables and short rails are made of raw stones of granite, and are transported to an installation place; and a large-scale substrate stage is set by assembling them at a place where the substrate stage is actually used.

However, when auxiliary mounting tables are attached to a main mounting table and the individually prepared rails are connected each other, there is a problem in that a step is formed at a joined portion of the rails or horizontalness of the rails cannot be ensured, so that substrates cannot be transferred at a high speed.

As technical documents describing large-scale substrate stages, there are the following publications, for example, JPA H07-311375 and JPA 2005-114882.

SUMMARY OF THE INVENTION

The present invention is to provide a split-type substrate stage which can transfer a substrate at a high speed, while ensuring the horizontalness and the linearity of rails.

In order to solve the above problems, the present invention is directed to a stage including a main mounting table, an auxiliary mounting table which has an area smaller than an area of the main mounting table and can be separated from the main mounting table, plural lower rails which are arranged over on the main mounting table and above the auxiliary mounting table and end portions of the lower rail positioned above the auxiliary mounting table, and a moving plate which is located above each of the lower rails and can be run above the lower rails, wherein each one of the plural lower rails is formed from a single raw plate, the lower rails are detachable attached to the main mounting table and the auxiliary mounting table, and the auxiliary mounting tables are provided with a vertically adjustable unit which can adjust the height of the lower rails at plural positions.

Further, the present invention is directed to the stage, further including a plurality of through holes provided in the moving plate through which moving up/down pins are inserted, and wherein the moving up/down pins can be inserted from a rear face side of the moving plate when the moving plate is positioned at a predetermined place of the auxiliary mounting tables.

Furthermore, the present invention is directed to the stage, wherein an upper rail being arranged above the lower rails is detachably attached to the main mounting table.

In addition, the present invention is directed to the stage, wherein an ink jet head is movably attached to the upper rail.

Moreover, the present invention is directed to a stage including a main mounting table, an auxiliary mounting table which has a smaller area than an area of the main mounting table and can be separated from the main mounting table, lower rails which are arranged over on the main mounting table and above the auxiliary mounting table and end portions of the lower rail is located above the auxiliary mounting table, and an upper rail which is attached movable along a direction in which the lower rails extend. Each of the lower rails is made of a single raw plate and can be detachably attached to the main mounting table and the auxiliary mounting table; the auxiliary mounting table is provided with a vertically adjusting unit which can adjust the height of the lower rails at plural positions; and the upper rail and the lower rails are detachably attached.

In this case, the present invention is also directed to the stage, wherein an ink jet head is movably attached to the upper rail.

Further, the present invention is directed to the stage, wherein the lower rails are made of granite.

Two or more lower rails on which the moving plate runs are arranged on the stage of the present invention. Each one of the plural lower rails on which the moving plate runs is made of the single raw plate. The present invention includes any of a case where the plural lower rails on which the moving plate runs are formed from the same raw plate, a case where they are formed from different raw plates, and a case where the above cases are mixed.

EFFECTS OF THE INVENTION

In the stage according to the present invention, one lower rail is not divided in the longitudinal direction, and the one lower rail is formed from the single raw plate. Therefore, since the linearity is ensured, the moving plate on which the substrate is placed is not swung, so that it can be moved at a high speed. Furthermore, the precision of positions where a discharge liquid land is increased.

Since the end portion of the lower rail is provided with the vertically adjusting unit, the linearity can be maintained even when the auxiliary table moves down.

DETAILED DESCRIPTION OF THE INVENTION

Figure 9:
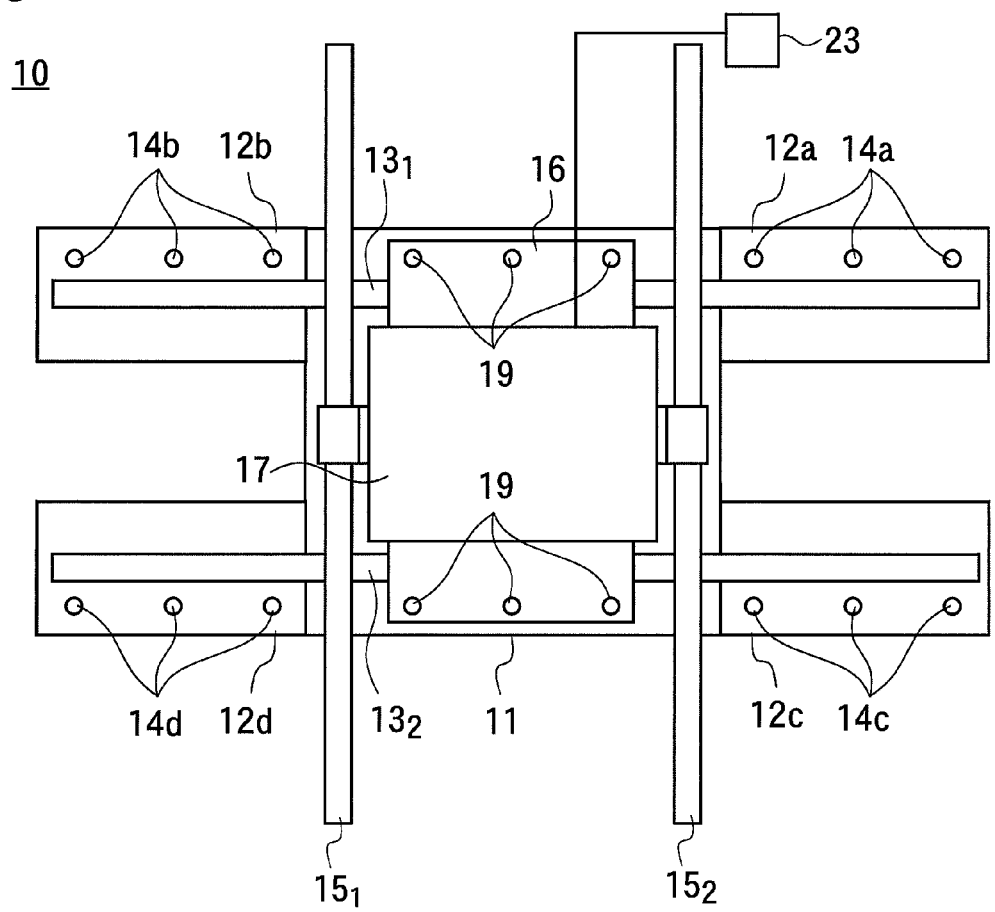
FIG. 9 is a plan view for illustrating the substrate stage of the present invention.
Figure 10:
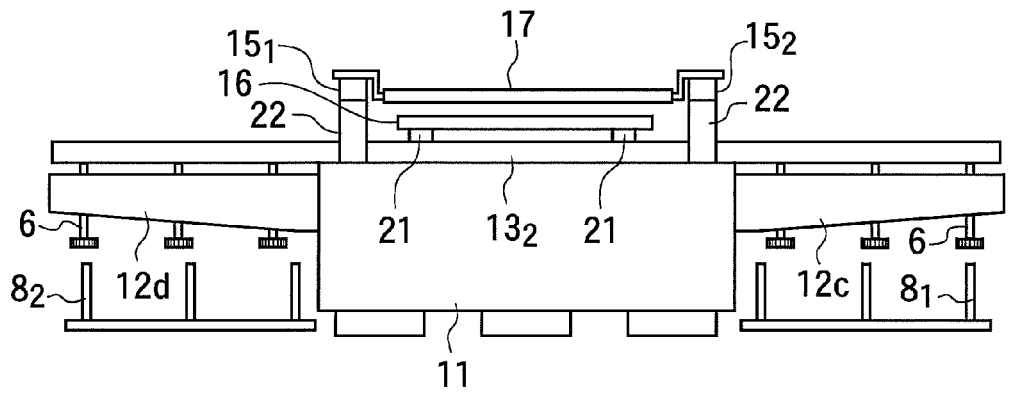
FIG. 10 is a side view for illustrating the substrate stage of the present invention.

Referring to FIGS. 9 and 10, a substrate stage 10 of the present invention includes a single main mounting table 11, a plurality (four in this embodiment) of auxiliary mounting tables 12a to 12d of which planar shape has a smaller size and a smaller area than the main mounting table 11, and two lower rails $13_1$, $13_2$.

FIGS. 9 and 10 are a plan view and a side view of the substrate stage 10 of the present invention in a state such that it is temporarily assembled in a producing place.

The planar shapes of the main mounting table 11 and the auxiliary mounting tables 12a to 12d are rectangular, and their surfaces are flat.

The main mounting table 11 and the auxiliary mounting tables 12a to 12d are configured so as to be detachable; and two auxiliary mounting tables 12a to 12d are fixed to each of mutually parallel two sides of the main mounting table 11, respectively.

The lower rails $13_1$, $13_2$ have lengths longer than the length of the main mounting table 11; their central portions are arranged on the main mounting table 11; one ends are arranged above the auxiliary mounting tables 12a, 12c on one side of the main mounting table 11; and the other ends are arranged above the auxiliary mounting tables 12b, 12d on the other side. The two lower rails $13_1$, $13_2$ are set in parallel to each other.

The main mounting table 11 is arranged such that its surface is horizontal; and the auxiliary mounting tables 12a to 12d are fixed to the main mounting table 11 in a state such that their surfaces are set lower than the main mounting table 11.

The auxiliary mounting tables 12a to 12d are provided with a plurality of vertically adjusting units 6. In this embodiment, the vertically adjusting unit 6 is a screw. Each of the vertically adjusting units 6 is upwardly inserted through the auxiliary mounting tables 12a to 12d from the bottom sides toward the surface sides, respectively.

Those portions of the lower rails $13_1$, $13_2$, which are placed on the main mounting table 11, closely contact the surface of the main mounting table 11; and those portions above the auxiliary mounting tables 12a to 12d are placed on upper ends of the vertically adjusting units 6.

The lower rails $13_1$, $13_2$ are made of granite. A guide of a linear moving unit is placed on the lower rails $13_1$, $13_2$. Granite has rigidity, but it is deformable by a very small amount. When the vertically adjusting units 6 are rotated to vertically move their tips, the end portions of the lower rails $13_1$, $13_2$ are bent so that the height of both end portions of the lower rails $13_1$, $13_2$ can be made higher or lower than the lower rails positioned on the main mounting table 11, while portions of the lower rails $13_1$, $13_2$ on the main mounting table 11 are kept in close contact with the surface of the main mounting table 11.

The lower rails $13_1$, $13_2$ are in contact with the tips of the vertically adjusting units 6 above the auxiliary mounting table 12a to 12d at a plurality of positions along the longitudinal directions of the lower rails $13_1$, $13_2$, so that when the heights of the tips of the plural vertically adjusting units 6 which are in contact with one lower rail $13_1$, $13_2$ are changed, the lower rails $13_1$, $13_2$ can be extended linearly or vertically bent. When the upper ends of the vertically adjusting units 6 are further moved upwardly as they are nearer to the ends of the lower rails $13_1$, $13_2$, the lower rails $13_1$, $13_2$ can be bent upwardly.

Furthermore, the lower rails $13_1$, $13_2$ are provided with horizontal plane-limited adjusting units; and the directions of the lower rails $13_1$, $13_2$ within the horizontal plane can be adjusted by the horizontal plane-limited adjusting units.

A moving plate 16 made of granite is placed on the lower rails $13_1$, $13_2$ via friction-reducing units 21 (such as, air bearings or the like); and when a substrate moving mechanism (not shown) is actuated, the moving plate 16 runs above the lower rails $13_1$, $13_2$ so that it can be located both on the auxiliary mounting table 12a to 12d and on the main mounting table 11.

Here, the moving plate 16 is provided with the friction-reducing units 21; and an air layer is provided between flat faces of the friction-reducing units 21 and the surfaces of the lower rails $13_1$, $13_2$ so that the moving plate 16 can be placed and run above the lower rails $13_1$, $13_2$, while the lower rails $13_1$, $13_2$ are in a non-contact state with the friction-reducing units 21 and the moving plate 16.

Moreover, although a single moving plate 16 is placed and run over on the two lower rails $13_1$, $13_2$ placed in parallel to each other, a single moving plate may be placed and run over on three lower rails arranged in parallel to one another.

Poles 22 are erected outside the two lower rails $13_1$, $13_2$ on the main mounting table 11; and two upper rails $15_1$, $15_2$ are arranged on the support poles 22 in parallel to each other and perpendicular to the directions in which the lower rails $13_1$, $13_2$ extend.

An ink jet head 17 is movably attached to the upper rails $15_1$, $15_2$. The upper rails $15_1$, $15_2$ have lengths longer than the width of the main mounting table 11, both the end portions are projected outside the main mounting table 11. When a head-moving mechanism (not shown) is actuated to run the ink jet head 17 along the upper rails $15_1$, $15_2$, the ink jet head 17 can be positioned above the main mounting table 11 as well as outside the main mounting table 11. The upper rails $15_1$, $15_2$ are horizontally arranged, and the ink jet head 17 moves within a horizontal plane.

The upper rails $15_1$, $15_2$ and the ink jet head 17 are located above the lower rails $13_1$, $13_2$; and interspace is formed between the lower rails $13_1$, $13_2$ and the upper rails $15_1$, $15_2$.

When the ink jet head 17 is located above the main mounting table 11 and a substrate is placed on the moving plate 16 and the moving plate 16 then moves, the moving plate 16 can pass a position immediately under the ink jet head 17 through the gap between the lower rails $13_1$, $13_2$ and the upper rails $15_1$, $15_2$.

Moving up/down pins $8_1$, $8_2$ are vertically arranged under the auxiliary mounting tables 12a to 12d. The moving up/down pins $8_1$, $8_2$ are fixed to a lifting and lowering device so that they can be vertically lifted and lowered.

The auxiliary mounting tables 12a to 12d and the moving plate 16 are formed with through holes 14a to 14d, 19, respectively.

The through holes 19 of the moving plate 16 are formed such that when the moving plate 16 is positioned above the auxiliary mounting tables 12a and 12c or 12b and 12d, they are positioned immediately above the through holes 14a and 14c or 14b and 14d of the auxiliary mounting table 12a to 12d. When the moving up/down pins $8_1$, $8_2$ are lifted in this state, upper ends of the moving up/down pins $8_1$, $8_2$ are projected out above the surface of the moving plate 16 through the through holes 14a and 14c or 14b and 14d and the through holes 19.

Figure 11:
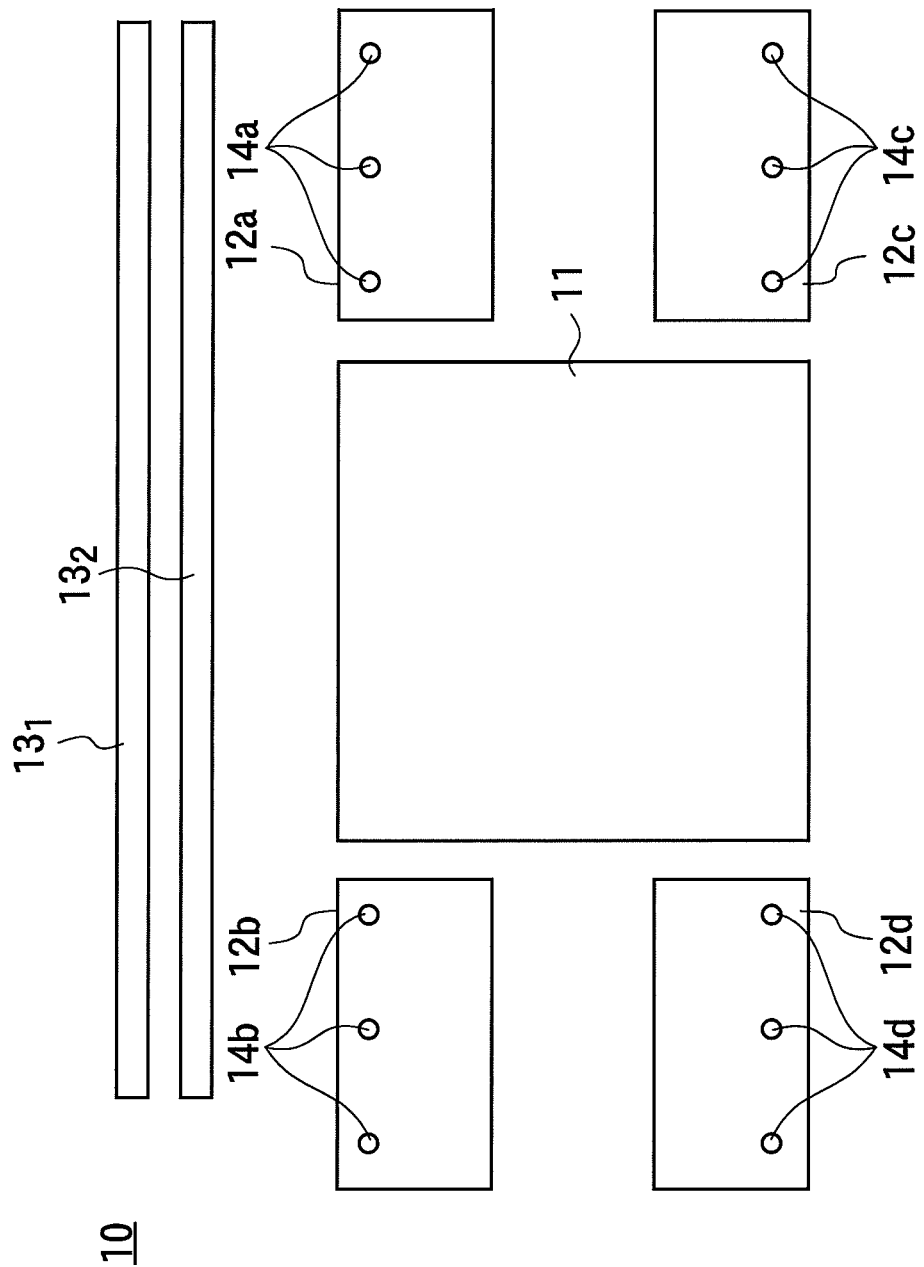
FIG. 11 is a plan view for showing auxiliary mounting tables, a main mounting table and lower rails after the separation of the substrate stage of the present invention.

This substrate stage 10 is once temporarily assembled at a production site such that the moving plate 16 and the ink jet head 17 can run as discussed above, production accuracies of the lower rails $13_1$, $13_2$, or the like are confirmed; thereafter, it is separated, and the parts (such as, the auxiliary mounting tables 12a to 12d and the lower rails $13_1$, $13_2$) are removed from the main mounting table 11. FIG. 11 shows the auxiliary mounting tables 12a to 12d and the lower rails $13_1$, $13_2$ removed from the main mounting table 11.

In this state, the substrate stage 10 is in a transportable size and separated members including the main mounting table 11, the auxiliary mounting tables 12a to 12d and the other parts are placed on a vehicle and transported to a site of actual use.

First, at the site of actual use, the main mounting table 11 is set such that the surface may be horizontal, and the substrate stage is assembled prior to the transport thereof by attaching the auxiliary mounting tables 12a to 12d to the side faces of the main mounting table 11.

The auxiliary mounting tables 12a to 12d are fixed, at one side faces to the side faces of the main mounting table 11. Portions of the auxiliary mounting tables 12a to 12d fixed to the main mounting table 11 are supported by the main mounting table 11, whereas the opposite side portions are not supported, and are bent downwardly due to their weights.

In the present invention, those portions of the lower rails $13_1$, $13_2$ which are positioned above the auxiliary mounting tables 12a to 12d are upwardly corrected by the vertically adjusting units 6 so that when the auxiliary mounting tables 12a to 12d are bent downwardly, the surfaces of the lower rails $13_1$, $13_2$ can be set horizontally.

When the angles of the lower rails $13_1$, $13_2$ in the horizontal plane are adjusted by the horizontal plane-limited adjusting device, the lower rails $13_1$, $13_2$ are extended linearly within the horizontal plane and the two lower rails $13_1$, $13_2$ are parallel in the horizontal plane.

Figure 1:
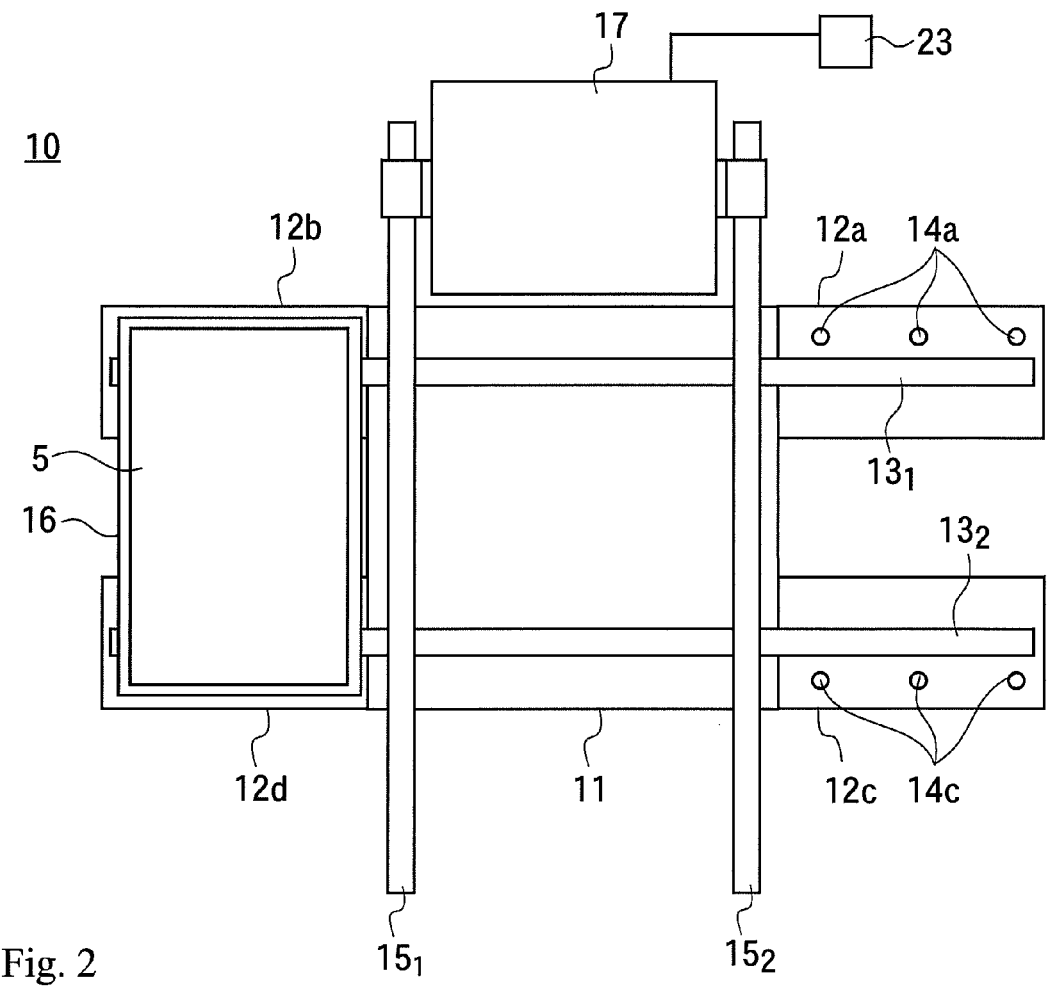
FIG. 1 is a plan view (1) for illustrating movement of a substrate stage of the present invention.
Figure 2:
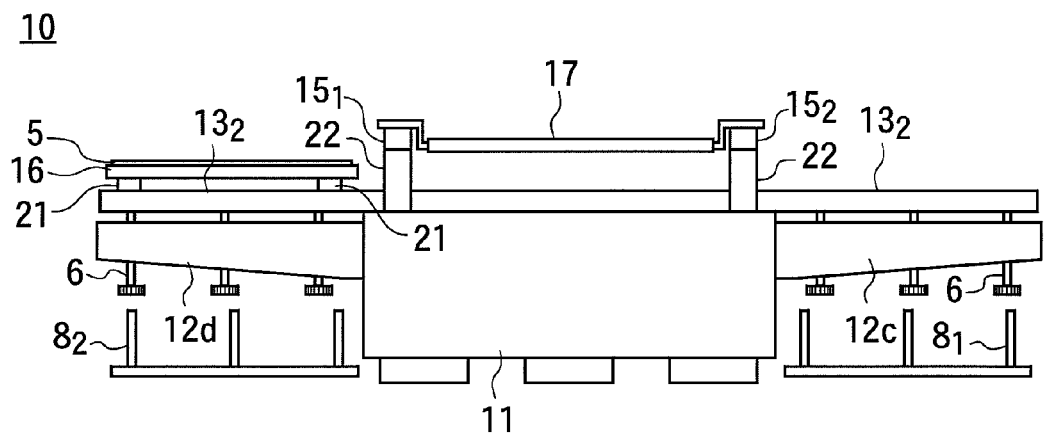
FIG. 2 is a side view (1) for illustrating the movement of the substrate stage of the present invention.

FIGS. 1 and 2 show a state such that the ink jet head 17 of which the substrate stage 10 assembled at the site of use is positioned outside the main mounting table 11, the moving plate 16 is positioned above the auxiliary mounting tables 12b, 12d, and the substrate 5 is placed on the moving plate 16.

Figure 3:
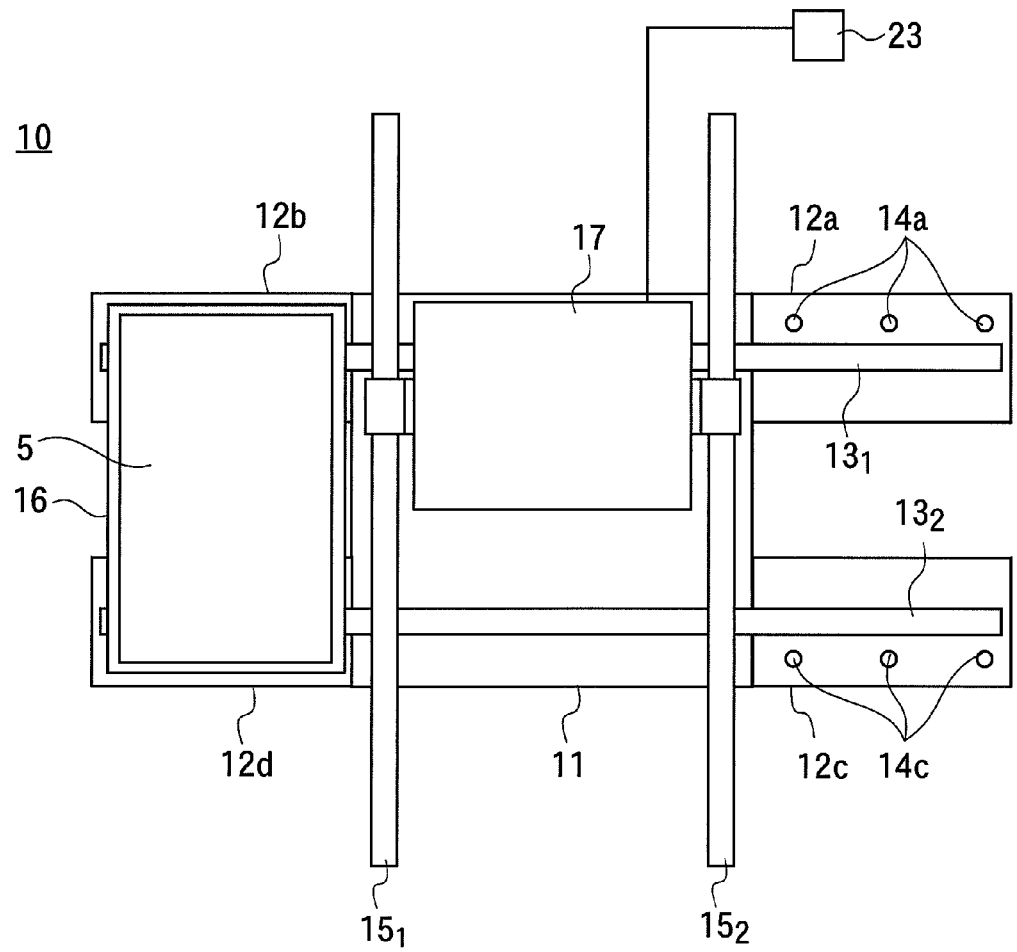
FIG. 3 is a plan view (2) for illustrating the movement of the substrate stage of the present invention.
Figure 4:
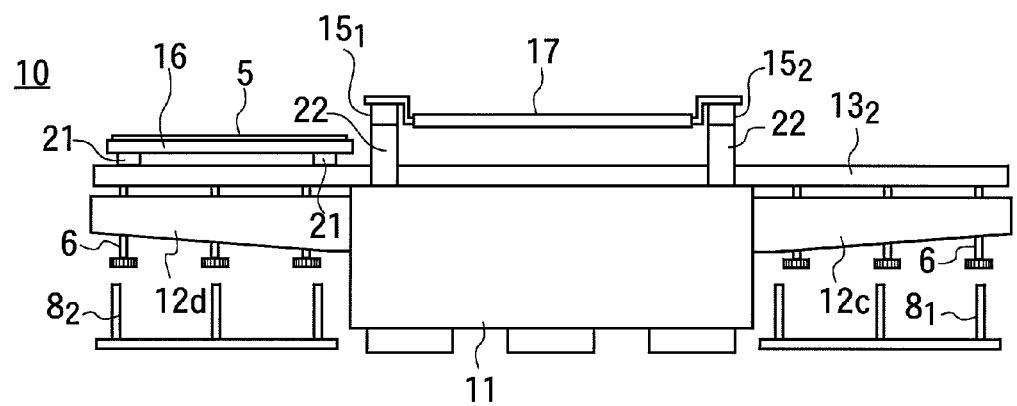
FIG. 4 is a side view (2) for illustrating the movement of the substrate stage of the present invention.
Figure 5:
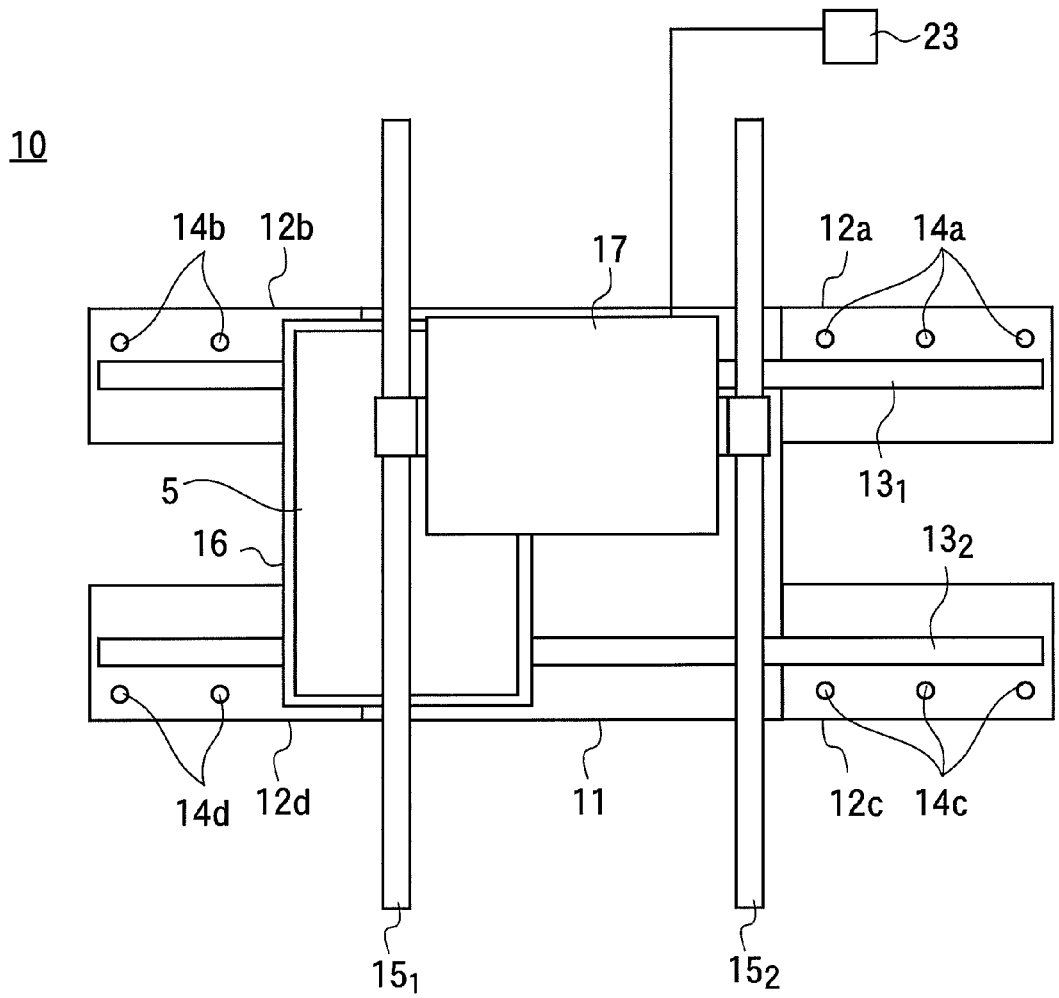
FIG. 5 is a plan view (3) for illustrating the movement of the substrate stage of the present invention.
Figure 6:
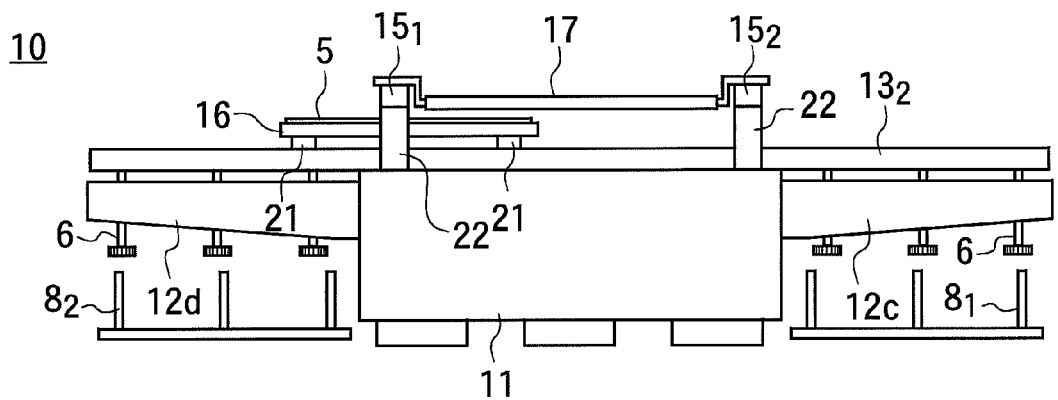
FIG. 6 is a side view (3) for illustrating the movement of the substrate stage of the present invention.

The ink jet head 17 is connected to a discharge liquid feeding system 23 in which a printing liquid is placed; and as shown in FIGS. 3 and 4, the ink jet head 17 is moved to above the main mounting table 11 and stopped above the main mounting table 11. Then, as shown in FIGS. 5 and 6, the substrate 5 is moved toward under the ink jet head 17.

A plurality of discharge orifices are provided at a face of the ink jet head 17 which is directed downwardly; and when a discharge mechanism provided in the ink jet head 17 is actuated while the printing liquid is being fed to the ink jet head 17 from the discharge liquid feeding system 23, liquid drops of the printing liquid can be discharged through each of the discharge orifices.

The discharge orifices are arranged along the width direction of the substrate (in a direction perpendicular to the moving direction of the substrate 5). The length of an area in which the discharge orifices are arranged is shorter than the width of the substrate 5; and when the printing liquid is discharged from the ink jet head 17, while the relative position between the ink jet head 17 and the substrate 5 is being controlled, the discharge liquid can land on desired positions within (the length of the substrate)×(the area in which the discharge orifices are arranged) in the area of (the length of the substrate)×(the width of the substrate) of the surface of the substrate 5.

After the discharge liquid lands in that area, the ink jet head 17 is moved, and then, the substrate 5 is moved in the state such that the ink jet head 17 is kept still, and the discharge liquid can land on the desired positions on the surface of the substrate 5 by discharging the discharge liquid toward the area of the surface of the substrate 5 where the discharge liquid does not land.

Since the lower rails $13_1$, $13_2$ are made straight by the vertically adjusting units 6 and the horizontally adjusting unit, when the moving plate 16 runs, no vibration occurs, so that the substrate 5 can be moved at a high speed. Furthermore, the accuracy of the hit positions of the discharge liquid is improved.

After the printing liquid has landed on the predetermined positions of the surface of the substrate 5 above the main mounting table 11, the substrate 5 is moved above the auxiliary mounting tables 12a, 12c, and the substrate 5 is moved from the moving table 16 to the moving up/down pins $8_1$ by lifting the moving up/down pins $8_1$. When the substrate 5 is transferred onto a hand of a substrate-transfer robot by inserting the hand between the substrate 5 and the moving table 16, the substrate 5 can be moved outside the substrate stage 10.

Figure 7:
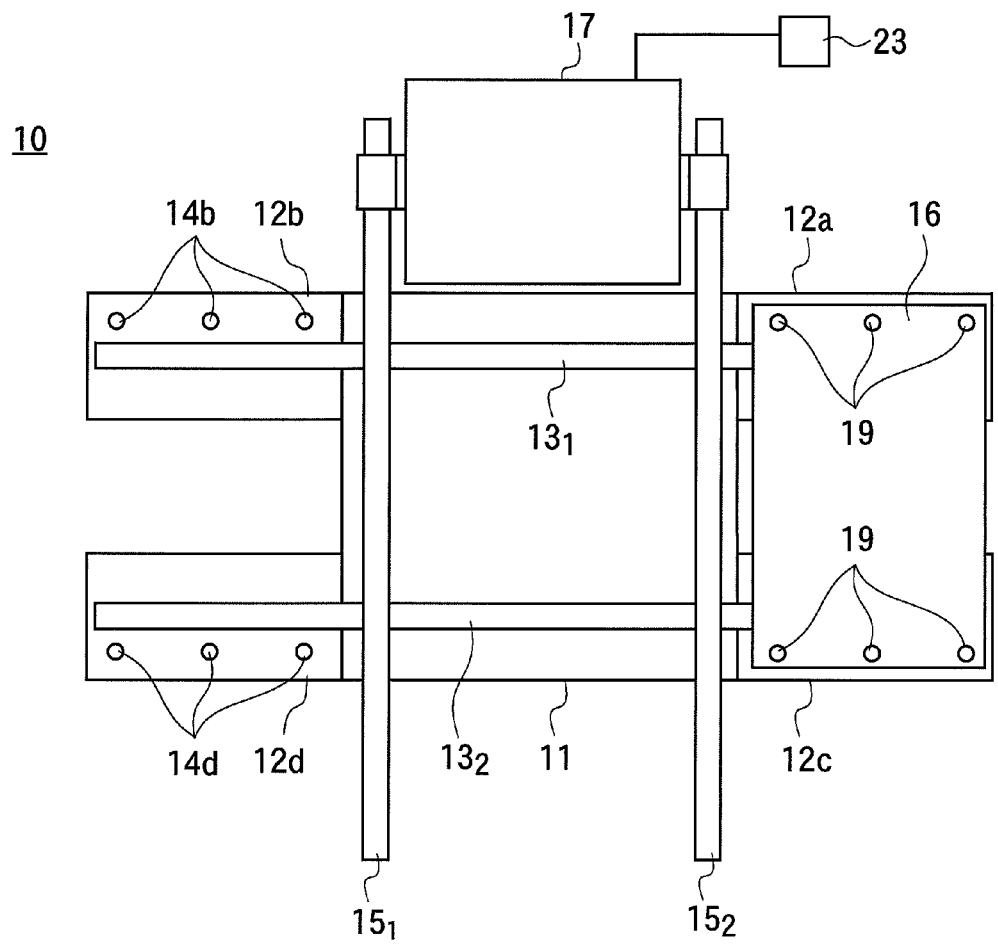
FIG. 7 is a plan view (4) for illustrating the movement of the substrate stage of the present invention.
Figure 8:
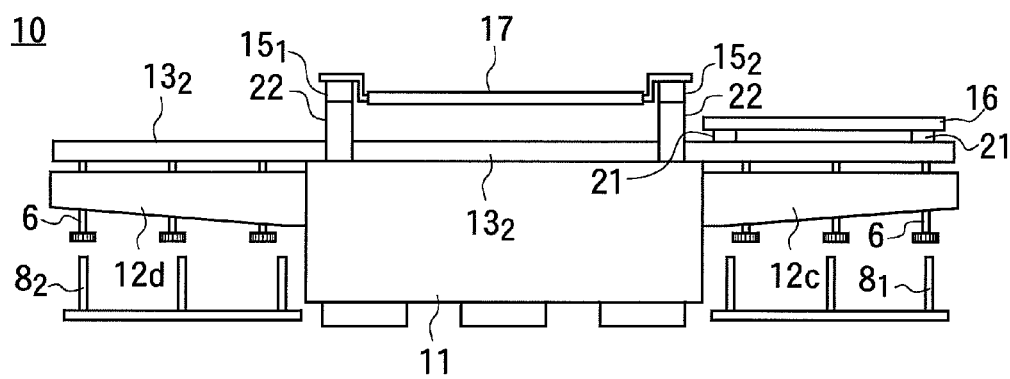
FIG. 8 is a side view (4) for illustrating the movement of the substrate stage of the present invention.

FIGS. 7 and 8 show a state in which the substrate 5 has been moved outside the substrate stage 10.

In the above embodiment, when the discharge liquid is to be discharged, the ink jet head 17 is stopped, the substrate 5 is moved and the discharge liquid is discharged. However, it may be that while the substrate 5 is kept still, the ink jet head 17 is moved and the discharge liquid is discharged. In summary, the substrate 5 and the ink jet head 17 have only to be relatively moved, and it may be that one of them is kept still, or both are moved.

Another device (such as, a measuring unit or the like), which may be attached to the upper rails $15_1$, $15_2$, may be used to replace the ink jet head 17.

Furthermore, although the upper rails $15_1$, $15_2$ are fixed to the main mounting table 11 in the above embodiment, if the upper rails $15_1$, $15_2$ are movably attached to the lower rails $13_1$, $13_2$ such that the upper rails $15_1$, $15_2$ can be moved in the direction in which the lower rails $13_1$, $13_2$ extend, the ink jet head 17 can be moved in mutually orthogonal two directions (X-Y) within a horizontal plane. Accordingly, even when the substrate 5 is kept still, the discharge liquid can land on the entire surface of the substrate 5.

In this case, if an attachment tool to which various devices can be attached is provided on the upper rails $15_1$, $15_2$ replaced with the ink jet head 17, the substrate stage can be used as a general-use X-Y stage.

Furthermore, in the above embodiment, the auxiliary mounting tables 12a to 12d are provided with the through holes 14a to 14d; and the moving up/down pins 81, 82 are inserted the through holes 14a to 14d and vertically moved in the through holes 14a to 14d so that the upper end of the moving up/down pins 81, 82 can be vertically moved in the range of a position higher than the surface of the auxiliary mounting tables 12a to 12d and a position lower than the surface of the auxiliary mounting tables 12a to 12d. Furthermore, the moving up/down pins 81, 82 may be provided at the location between the auxiliary mounting tables 12a and 12c of which the auxiliary tables are positioned at one side of the main mounting table or between the auxiliary mounting tables 12b and 12d of which the auxiliary tables are positioned at opposite side of the main mounting table, and the moving up/down pins 81, 82 are made to move vertically, so that the upper end of the moving up/down pins 81, 82 can be vertically moved in the range of a position higher than the surface of the auxiliary mounting tables 12*a* to 12*d* and a position lower than the surface of the auxiliary mounting tables 12*a* to 12*d*.

What is claimed is:

1. A stage, comprising:

a main mounting table;

an auxiliary mounting table which has an area smaller than an area of the main mounting table and can be separated from the main mounting table;

a plurality of lower rails which are arranged over on the main mounting table and above the auxiliary mounting table, end portions of the lower rail being positioned above the auxiliary mounting table; and a moving plate which is located above each of the lower rails and can be run above the lower rails, wherein each one of the plurality of lower rails is formed from a single raw plate, the lower rails being detachably attached to the main mounting table and the auxiliary mounting table, and wherein the auxiliary mounting tables are provided with a vertically adjusting unit which can adjust the height of the lower rails at plural positions, wherein one side of each auxiliary mounting table is fixed to the main mounting table and a portion of the auxiliary mounting table, which is fixed to the main mounting table, is supported by the main mounting table, and a portion of the auxiliary mounting table opposed to the portion of the auxiliary mounting table, which is fixed to the main mounting table, is unsupported by the main mounting table.

2. The stage according to claim 1, further comprising:

a plurality of through holes provided in the moving plate through which moving up/down pins are inserted, and wherein the moving up/down pins can be inserted from a rear face side of the moving plate when the moving plate is positioned at a predetermined place of the auxiliary mounting tables.

3. The stage according to claim 1, wherein an upper rail arranged above the lower rails is detachably attached to the main mounting table.

4. The stage according to claim 3, wherein an ink jet head is movably attached to the upper rail.

5. A stage, comprising:

a main mounting table;

an auxiliary mounting table which has a smaller area than an area of the main mounting table and can be separated from the main mounting table;

a plurality of lower rails which are arranged over on the main mounting table and above the auxiliary mounting table, end portions of the lower rail being located above the auxiliary mounting table; and an upper rail which is moveably attached along a direction in which the lower rails extend, wherein each one of the lower rails is made of a single raw plate and can be detachably attached to the main mounting table and the auxiliary mounting table, the auxiliary mounting table being provided with a vertically adjusting unit which can adjust the height of the lower rails at plural positions, and the upper rail and the lower rails being detachably attached, wherein one side of each auxiliary mounting table is fixed to the main mounting table and a portion of the auxiliary mounting table, which is fixed to the main mounting table, is supported by the main mounting table, and a portion of the auxiliary mounting table opposed to the portion of the auxiliary mounting table, which is fixed to the main mounting table, is unsupported by the main mounting table.

6. The stage according to claim 5, wherein an ink jet head is movably attached to the upper rail.

7. The stage according to claim 1, wherein the lower rails are made of granite.

* * * * *